US009733755B2

(12) United States Patent
Yang

(10) Patent No.: US 9,733,755 B2
(45) Date of Patent: Aug. 15, 2017

(54) TOUCH PANEL AND DRIVE CIRCUIT THEREOF

(71) Applicants: Xiamen Tianma Micro-Electronics Co., Ltd., Xiamen (CN); Tianma Micro-Electronics Co., Ltd., Shenzhen (CN)

(72) Inventor: Yizhi Yang, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 144 days.

(21) Appl. No.: 14/849,533

(22) Filed: Sep. 9, 2015

(65) Prior Publication Data
US 2016/0328072 A1 Nov. 10, 2016

(30) Foreign Application Priority Data
May 8, 2015 (CN) .......................... 2015 1 0232449

(51) Int. Cl.
G06F 3/041 (2006.01)
G06F 3/044 (2006.01)
G09G 3/20 (2006.01)

(52) U.S. Cl.
CPC ............ G06F 3/0416 (2013.01); G06F 3/044 (2013.01); G06F 3/0412 (2013.01); *G09G 3/20* (2013.01);
(Continued)

(58) Field of Classification Search
CPC ...... G06F 3/044; G06F 3/0416; G06F 3/0412; G06F 3/0426; G09G 2310/0297; G09G 3/20
See application file for complete search history.

(56) References Cited

U.S. PATENT DOCUMENTS

2009/0128545 A1* 5/2009 Lee ........................ G06F 3/0412
345/214
2011/0267296 A1 11/2011 Noguchi et al.
(Continued)

FOREIGN PATENT DOCUMENTS

| CN | 102342096 A | 2/2012 |
| CN | 103454800 A | 12/2013 |
| CN | 103455217 A | 12/2013 |

Primary Examiner — Viet Pham
Assistant Examiner — Maheen Javed
(74) Attorney, Agent, or Firm — Faegre Baker Daniels LLP

(57) ABSTRACT

A drive circuit of a touch panel includes a signal selection circuit and a de-multiplexing circuit, where in a display phase, the signal selection circuit is configured to forward a display signal to the de-multiplexing circuit, which is configured to de-multiplex the display signal and transmit signals resulting from the de-multiplexing of the display signal to the data lines; and in a touch phase, the signal selection circuit is configured to forward a touch driving signal to the de-multiplexing circuit, which is configured to de-multiplex the touch driving signal and transmit signals resulting from the de-multiplexing of the touch driving signal to the data lines, so that the pulse signals on the data lines are identical to the pulse signals on the touch driving signal lines and touch electrodes in the touch phase due to the signal selection circuit.

8 Claims, 7 Drawing Sheets

(52) U.S. Cl.
CPC ........... *G09G 2300/0426* (2013.01); *G09G 2310/0297* (2013.01)

(56) References Cited

U.S. PATENT DOCUMENTS

| | | | |
|---|---|---|---|
| 2014/0160041 A1* | 6/2014 | Kim | G06F 3/0416 345/173 |
| 2014/0307004 A1* | 10/2014 | Roh | G09G 3/3208 345/690 |
| 2016/0148556 A1* | 5/2016 | Tseng | G09G 3/3677 345/55 |

* cited by examiner

| | Between touch driving signal line and TFT | Between touch driving signal line and display signal line | Between touch driving signal line and pixel electrode | Between touch driving signal line and common electrode | Between touch driving signal line and ground | Between touch driving signal line and other wirings |
|---|---|---|---|---|---|---|
| Coupling capacitance | 12.96 | 247.14 | 51.29 | 2.13 | 4.54 | 5.80 |
| Sum | 323.86 ||||||

| | Between touch driving signal line and TFT | Between touch driving signal line and display signal line | Between touch driving signal line and pixel electrode | Between touch driving signal line and common electrode | Between touch driving signal line and ground |
|---|---|---|---|---|---|
| Coupling capacitance | 1.66 | 33.49 | 2.60 | 5.80 | 0.32 |
| Sum | 43.88 | | | | |

TOUCH PANEL AND DRIVE CIRCUIT THEREOF

CROSS-REFERENCE TO RELATED APPLICATION

This application claims priority to Chinese Application No. 201510232449.5, filed May 8, 2015, which is herein incorporated by reference in its entirety.

TECHNICAL FIELD

The present disclosure relates to the field of display technologies and, in particular, to a touch panel and a drive circuit thereof.

BACKGROUND

Touch panels include add-on touch panels and in-cell touch panels. The add-on touch panel is constructed by a touch sensing panel and a display panel, which are separately manufactured and then assembled together, as a result, the add-on touch panel formed in such manufacturing process has an increased thickness, and further has decreased light transmittance and contrast ratio and increased manufacturing costs due to the presence of transparent glass or film layers of the touch sensing panel on the display panel. However, in the in-cell touch panel, a touch sensing panel is directly incorporated inside a display panel, so that manufacturing processes are simplified and materials such as transparent glass or film layers are saved. Thus the in-cell touch panel has a lowered manufacturing cost, a high light transmittance and a decreased thickness. Accordingly, integrating a touch structure within a display structure has become a general trend in the field of display technologies.

FIG. 1 is a schematic diagram showing a structure of an array substrate of a display panel in the related art. As shown in FIG. 1, the array substrate 10 includes common electrode blocks 11 (which are operable as touch electrodes), touch driving signal lines 12 connected with the common electrode blocks 11, and other conductive wirings 13 (such as display signal lines for transmitting display signals, including data lines and scan lines). Generally, a voltage difference is present between the touch driving signal line 12 and the other conductive wiring 13, and thus the touch driving signal line 12 couples with the other conductive wiring 13, generating a coupling capacitance. FIG. 2 shows a table listing coupling capacitances generated between the touch driving signal lines 12 and the other conductive wirings 13 (or other conductive elements) coupling with the touch driving signal lines 12 in the related art. In the related art, different pulse signals are inputted to the touch driving signal lines and the display signal lines, so that a significant voltage difference is present between the touch driving signal lines and the display signal lines, thereby generating the significant coupling capacitance between the touch driving signal lines and the display signal lines. For example, as shown in FIG. 2, the coupling capacitance generated due to the coupling between the touch driving signal line 12 and the display signal line is as high as 247.14 F, while the coupling capacitance generated due to the coupling between the touch driving signal line 12 and other conductive element (such as a pixel electrode, or a common electrode) or other conductive wiring is relatively low. That is, the coupling capacitance generated between the touch driving signal line 12 and the display signal line is major among others. As a result, a driving ability of a drive integrated circuit (IC) becomes insufficient due to the presence of these coupling capacitances, causing increased power consumption.

SUMMARY

In view of the above, embodiments of the disclosure provide a touch panel and a drive circuit thereof.

In embodiments, a drive circuit of a touch panel includes a signal selection circuit and a de-multiplexing circuit,
where a first input terminal of the signal selection circuit is connected with a touch driving signal input line for transmission of a touch driving signal, a second input terminal of the signal selection circuit is connected with a display signal input line for transmission of a display signal, and an output terminal of the signal selection circuit is connected with an input terminal of the de-multiplexing circuit;
an output terminal of the de-multiplexing circuit is connected with a plurality of pixel electrodes through respective data lines;
in a display phase, the signal selection circuit is configured to forward the display signal received from the display signal input line to the de-multiplexing circuit, which is configured to de-multiplex the display signal from the signal selection circuit and transmit signals resulting from the de-multiplexing of the display signal to the data lines; and
in a touch phase, the signal selection circuit is configured to forward the touch driving signal received from the touch driving signal input line to the de-multiplexing circuit, which is configured to de-multiplex the touch driving signal from the signal selection circuit and transmit signals resulting from the de-multiplexing of the touch driving signal to the data lines.

In embodiments, a touch panel includes a color filter substrate, an array substrate disposed opposite to the color filter substrate, and the above drive circuit of the touch panel.

In the touch panel and the drive circuit of the touch panel, according to embodiments of the disclosure, through the signal selection circuit, touch driving signals are applied to the data lines (i.e. display signal lines) in the touch phase, so that the pulse signals on the data lines are identical to the pulse signals on the touch driving signal lines and touch electrodes in the touch phase, thereby decreasing the voltage difference between the data lines and the touch driving signal lines as well as the touch electrodes, reducing the load of the drive IC and the coupling capacitances in the touch phase, and shortening the time for charging the touch electrodes by the touch driving signals, so that the power consumption is reduced. Further, the signal selection circuit has a simple circuit structure, without substantially increasing the complexity of the touch panel.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

Accompanying drawings for the description of embodiments of the disclosure are briefly introduced below to clearly illustrate technical solutions in the embodiments of the disclosure. Obviously, the accompanying drawings described below illustrate some embodiments of the disclosure, and other drawings may be derived from the described embodiments of the disclosure and these accompanying drawings.

Figures 1, 2:
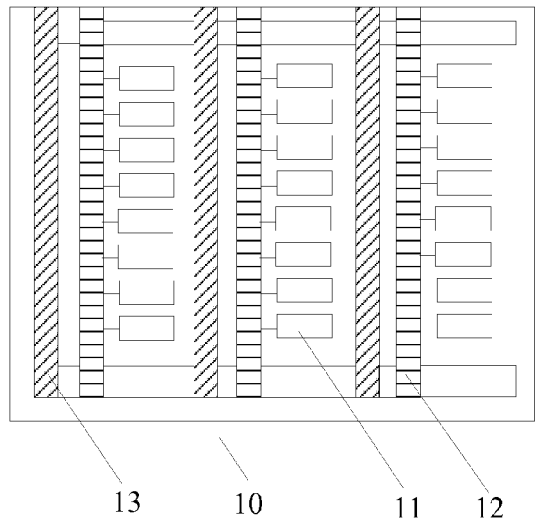
FIG. 1 is a schematic diagram showing a structure of an array substrate of a touch panel in the related art.
FIG. 2 shows a table listing coupling capacitances generated between touch driving signal lines and other conductive wirings (or conductive elements) coupling with the touch driving signal lines in the related art.

While the disclosure is amenable to various modifications and alternative forms, embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

Technical solutions of embodiments of the disclosure will be further described in detail below in combination with the accompanying drawings to make the solved technical problem, the adopted technical solutions and the achieved technical effect of the disclosure more clear. Obviously, only some of the embodiments of the disclosure rather than all of the embodiments are described herein. In light of the described embodiments of the disclosure, all other embodiments obtained by those skilled in the art without inventive work fall in the scope of the disclosure.

Before embodiments of the disclosure are described, a touch structure for implementing a touch sensing function is briefly introduced as follows. At present, the touch structure for implementing the touch sensing function can be designed as an electromagnetic touch structure or a capacitive touch structure. In the electromagnetic touch structure, coils arranged in two different directions are utilized for the touch sensing function; while in the capacitive touch structure, one type of touch electrodes are provided and the touch sensing function is achieved by the self-capacitance between the touch electrodes and the ground, or two types of touch electrodes (i.e. touch driving electrodes and touch sensing electrodes) are provided and the touch sensing function is achieved by the mutual-capacitance between the two types of touch electrodes. The solutions of the present disclosure are suitable for the capacitive touch structure.

In the case that the capacitive touch structure includes two types of touch electrodes, the two types of touch electrodes may be disposed at the same layer, and are arranged in parallel with each other, or intersect each other and bridge structures (i.e. bypasses) are employed for connections of touch electrode segments at the intersections of the two types of touch electrodes. As desired, the two types of touch electrodes may be alternatively disposed at different layers and intersect each other.

In view of the above-described capacitive touch structure and the defects present in the related art, the following solutions are provided in embodiments of the disclosure.

Figures 3, 4:
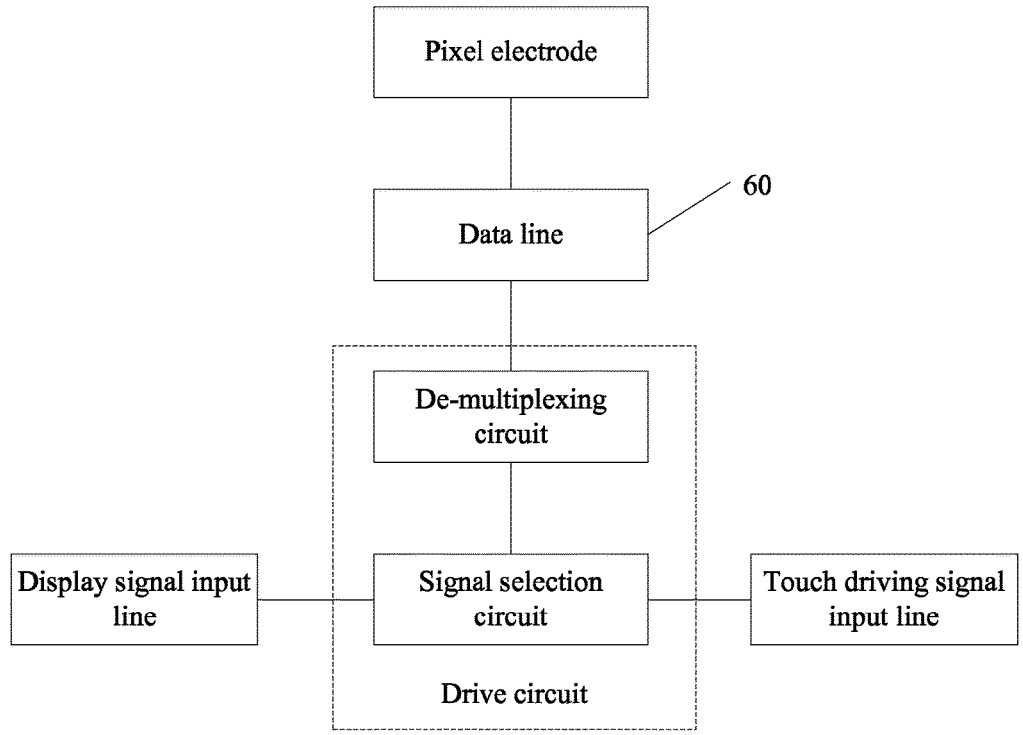
FIG. 3 is a block diagram showing a structure of a drive circuit of a touch panel, according to embodiments of the disclosure.
FIG. 4 is a table listing coupling capacitances generated between touch driving signal lines and other conductive lines or conductive elements coupling with the touch driving signal lines after the employment of the drive circuit of the touch panel, according to embodiments of the disclosure.

Embodiments of the disclosure provide a drive circuit of a touch panel. FIG. 3 is a block diagram showing a structure of the drive circuit of the touch panel, according to embodiments of the disclosure.

As shown in FIG. 3, the drive circuit of the touch panel includes a signal selection circuit and a de-multiplexing circuit.

A first input terminal of the signal selection circuit is connected with a touch driving signal input line for transmission of a touch driving signal, a second input terminal of the signal selection circuit is connected with a display signal input line for transmission of a display signal, and an output terminal of the signal selection circuit is connected with an input terminal of the de-multiplexing circuit.

An output terminal of the de-multiplexing circuit is connected with pixel electrodes through the respective data lines.

In a display phase, the signal selection circuit forwards the display signal received from the display signal input line to the de-multiplexing circuit, which then de-multiplexes the display signal from the signal selection circuit and transmits signals resulting from the de-multiplexing of the display signal to the data lines.

In a touch phase, the signal selection circuit forwards the touch driving signal received from the touch driving signal input line to the de-multiplexing circuit, which then de-multiplexes the touch driving signal from the signal selection circuit and transmits signals resulting from the de-multiplexing of the touch driving signal to the data lines.

It is noted that the display signal is transmitted from a display drive unit in the drive IC of the touch panel to the display signal input line, and the touch driving signal is transmitted from a touch drive unit in the drive IC of the touch panel to the touch driving signal input line. The drive IC can be disposed on a transparent substrate at a border region of an array substrate of the touch panel, and includes the touch drive unit, which is configured to provide touch driving signals to the touch electrodes of the touch panel, and the display drive unit which is configured to provide display signals to the pixel units of the touch panel.

It is noted that a plurality of signals may be multiplexed into one combined signal for transmission, and the combined signal is de-multiplexed at a receiving side into the plurality of signals for separate transmission, so that resources are saved by the multiplexing and de-multiplexing.

The display panel generally includes a plurality of common electrode blocks. In the display phase, a common voltage signal is applied to the common electrode blocks, and in the touch phase, touch driving signals are applied to the common electrode blocks. Therefore, the common electrode blocks are also operable as touch electrodes, which are further electrically connected with the touch drive unit via touch driving signal lines. In this way, the display phase and the touch phase operate in a time-division mode, and in the touch phase, touch driving signals are applied to the touch electrodes to achieve the touch sensing function.

FIG. 4 is a table listing coupling capacitances generated between touch driving signal lines and other conductive lines or conductive elements coupling with the touch driving signal lines in the drive circuit of the touch panel, according to embodiments of the disclosure.

In embodiments, identical pulse signals are applied to the touch driving signal lines and the display lines, so that merely an insignificant voltage difference is present between the touch driving signal lines and the display lines, thus a small coupling capacitance is caused. As shown in FIG. 4, the coupling capacitance caused due to the coupling between the touch driving signal lines and the display lines is as low as 33.49 F, without substantially increasing power consumption.

In the drive circuit of the touch panel, the display signal input line may be selectively connected with the touch driving signal input line via the signal selection circuit, and touch driving signals are applied to the data lines (i.e. display signal lines) in the touch phase, so that the pulse signals on the data lines are identical to the pulse signals on the touch driving signal lines and touch electrodes in the touch phase, thereby decreasing the voltage difference between the data lines and the touch driving signal lines as well as the touch electrodes, reducing the load of the drive IC and the coupling capacitances in the touch phase, and shortening the time for charging the touch electrodes by the touch driving signals, so that the power consumption is reduced. Further, the signal selection circuit has a simple circuit structure, without substantially increasing the complexity of the touch panel.

A drive circuit of the touch panel is provided according to embodiments of the disclosure. The drive circuit of the touch panel includes a switch configured to control the type of a signal inputted to the data lines, and FIG. 5 is a block diagram showing a structure of the drive circuit of the touch panel, according to embodiments of the disclosure.

Figure 5:
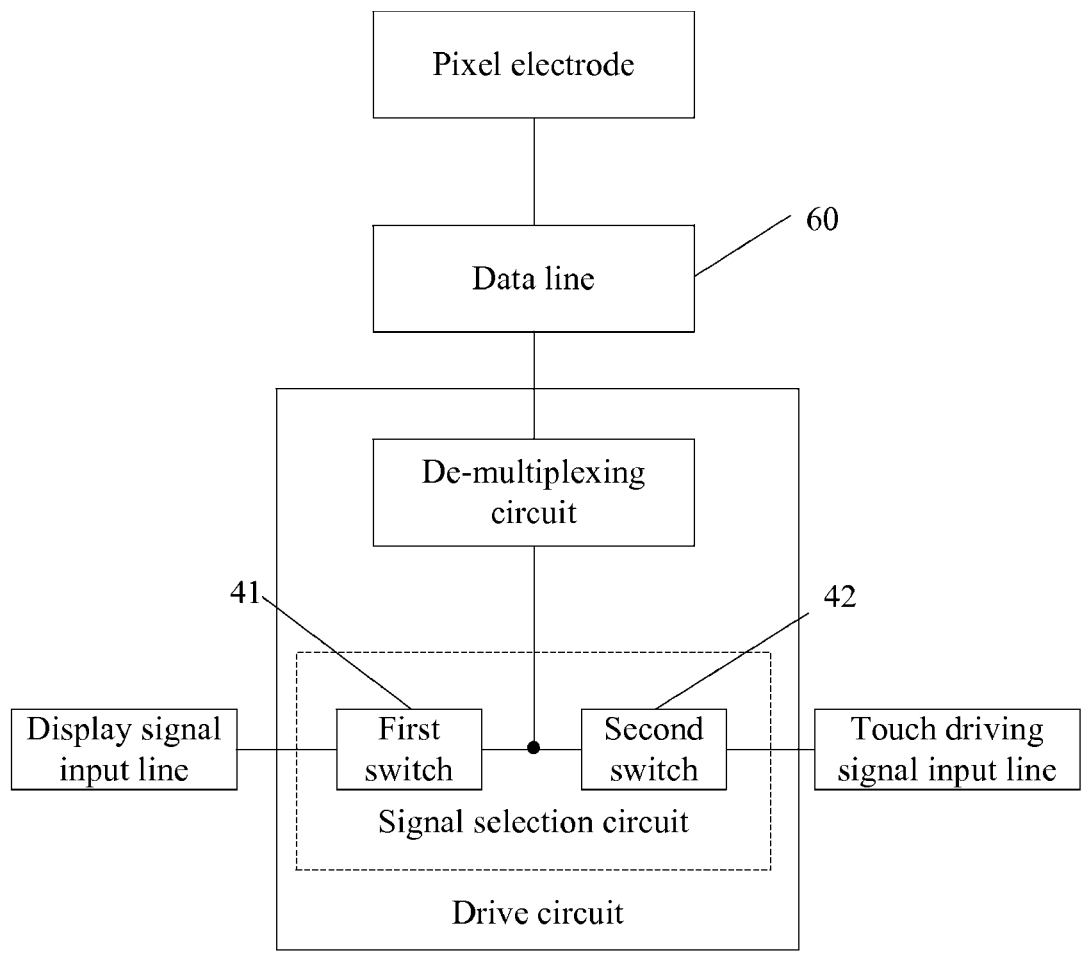
FIG. 5 is a block diagram showing a structure of a drive circuit of a touch panel, according to embodiments of the disclosure.

As shown in FIG. 5, based on embodiments described in combination with FIG. 3, the drive circuit includes a signal selection circuit and a de-multiplexing circuit, and the signal selection circuit includes a first switch 41 and a second switch 42, where the first switch 41 is configured to connect a first input terminal of the signal selection circuit to a display signal input line and disconnect the first input terminal of the signal selection circuit from the display signal input line, and the second switch 42 is configured to connect a second input terminal of the signal selection circuit to a touch driving signal input line and disconnect the second input terminal of the signal selection circuit from the touch driving signal input line. In embodiments, in the display phase, the second switch 42 disconnects the second input terminal of the signal selection circuit from the touch driving signal input line, and the first switch 41 connects the first input terminal of the signal selection circuit to the display signal input line, so that display signals from the display drive unit are transmitted to the data lines via the display signal input line, and further to the respective pixel electrodes via the data lines. In the touch phase, the first switch 41 disconnects the first input terminal of the signal selection circuit from the display signal input line, and the second switch 42 connects the second input terminal of the signal selection circuit to the touch driving signal input line, so that touch driving signals from the touch drive unit are transmitted to the data lines via the touch driving signal input line. In this case, the pulse signals on the data lines are identical to the pulse signals on the touch driving signal lines and touch electrodes in the touch phase, thus a coupling effect between the data lines and the touch driving signal lines as well as the touch electrodes is alleviated and the power consumption is reduced.

Herein, a control terminal, an input terminal and an output terminal of the first switch 41 are connected with a first control line, the display signal input line and an input terminal of the de-multiplexing circuit, respectively, while a control terminal, an input terminal and an output terminal of the second switch 42 are connected with a second control line, the touch driving signal input line and the input terminal of the de-multiplexing circuit, respectively.

Figure 6:
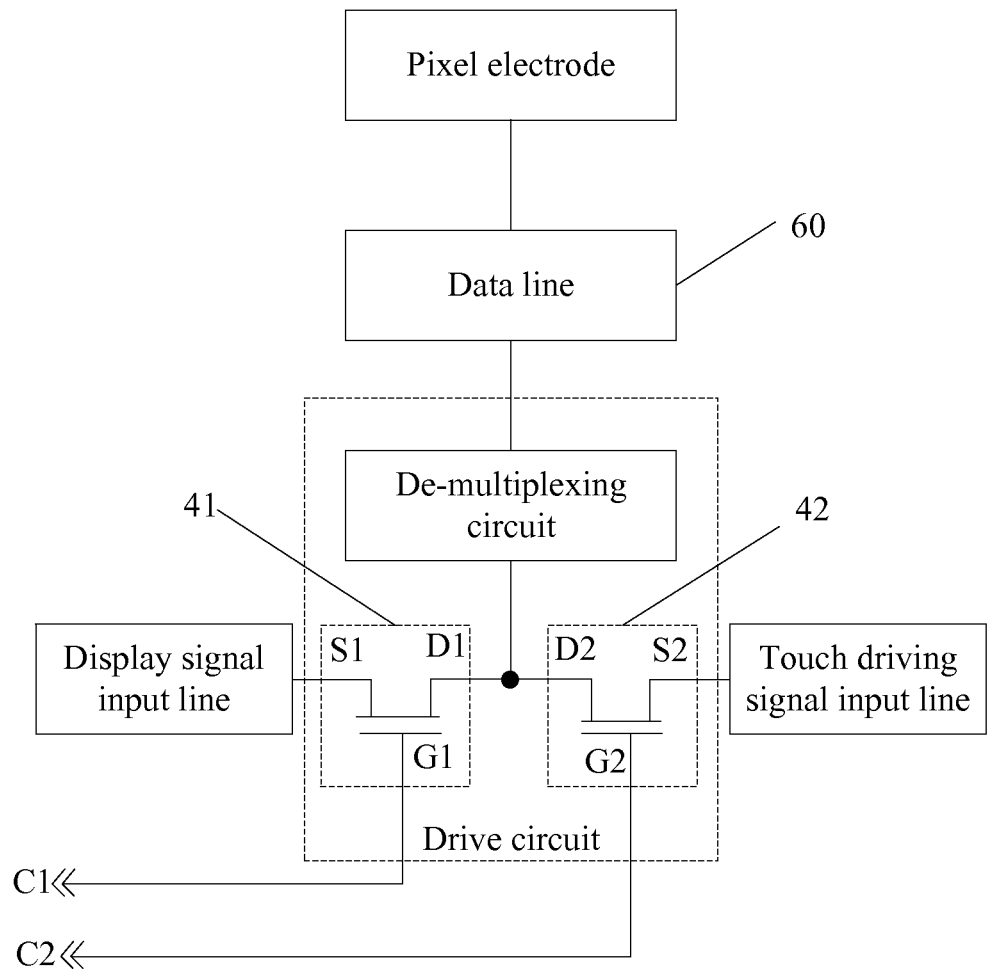
FIG. 6 shows a circuit diagram of the drive circuit of the touch panel, according to embodiments of the disclosure.

FIG. 6 shows a circuit diagram of the drive circuit of the touch panel, according to embodiments of the disclosure.

In embodiments, as shown in FIG. 6, the signal selection circuit includes the first switch 41 and the second switch 42, which are both Thin Film Transistors (TFTs). The control terminal G1, the input terminal S1 and the output terminal D1 of the first switch 41 are connected with the first control line C1, the display signal input line and the input terminal of the de-multiplexing circuit, respectively, while the control terminal G2, the input terminal S2 and the output terminal D2 of the second switch 42 are connected with the second control line C2, the touch driving signal input line and the input terminal of the de-multiplexing circuit, respectively. In embodiments, the first switch 41 and the second switch 42 are both embodied as N-type TFTs. In the display phase, a low level is applied to the second switch 42 via the second control line C2 so that the second input terminal of the signal selection circuit is disconnected from the touch driving signal input line, and a high level is applied to the first switch 41 via the first control line C1 so that the first input terminal of the signal selection circuit is connected to the display signal input line. Thus display signals from the display drive unit are transmitted to the data lines 60 via the display signal input line, and further to the respective pixel electrodes via the data lines. In the touch phase, a low level is applied to the first switch 41 via the first control line C1 so that the first input terminal of the signal selection circuit is disconnected from the display signal input line, while a high level is applied to the second switch 42 via the second control line C2 so that the second input terminal of the signal selection circuit is connected to the touch driving signal input line, thus touch driving signals from the touch drive unit are transmitted to the data lines via the touch driving signal input line. In this case, the pulse signals on the data lines are identical to the pulse signals on the touch driving signal lines in the touch phase, thus a coupling effect between the data lines and the touch driving signal lines is alleviated and the power consumption is reduced.

In some embodiments, the first switch 41 and the second switch 42 are both embodied as P-type TFTs. Or, the first switch 41 is embodied as one of the N-type TFT and the P-type TFT, while the second switch 42 is embodied as the other of the N-type TFT and the P-type TFT, which is not limited herein.

In some embodiments, in the drive circuit of the touch panel, the display signal input line and the touch driving signal input line may be selectively connected via the signal selection circuit, and the signal selection circuit includes the switches, which are embodied as TFTs and function to control signal transmission. In the display phase, the display signal from the display signal input line is received by the de-multiplexing circuit, which de-multiplexes the received display signal and then outputs display signals resulting from the de-multiplexing to the data lines. In the touch phase, the touch driving signal from the touch driving signal input line is received by the de-multiplexing circuit, which de-multiplexes the received touch driving signal and then outputs touch driving signals resulting from the de-multiplexing to the data lines. As such, the touch driving signals are applied to the data lines in the touch phase, so that the pulse signals on the data lines are identical to (in terms of frequency and amplitude of the pulse signal) the pulse signals on the touch driving signal lines and touch electrodes in the touch phase, thereby decreasing the voltage difference between the data lines and the touch driving signal lines as well as the touch electrodes, reducing the load of the drive IC and the coupling capacitances in the touch phase, and shortening the time for charging the touch electrodes by the touch driving signals, so that the power consumption is reduced. Further, the TFTs embodying the first switch 41 and the second switch 42 may be manufactured in a process for manufacturing the touch panel, without newly added masking process. Thus, the process for the touch panel is simple, without substantially increasing manufacturing costs and time.

A drive circuit of a touch panel is provided according to embodiments of the disclosure, and the drive circuit of the touch panel includes TFTs configured to control the transmission of signals into data lines 60.

Figure 7:
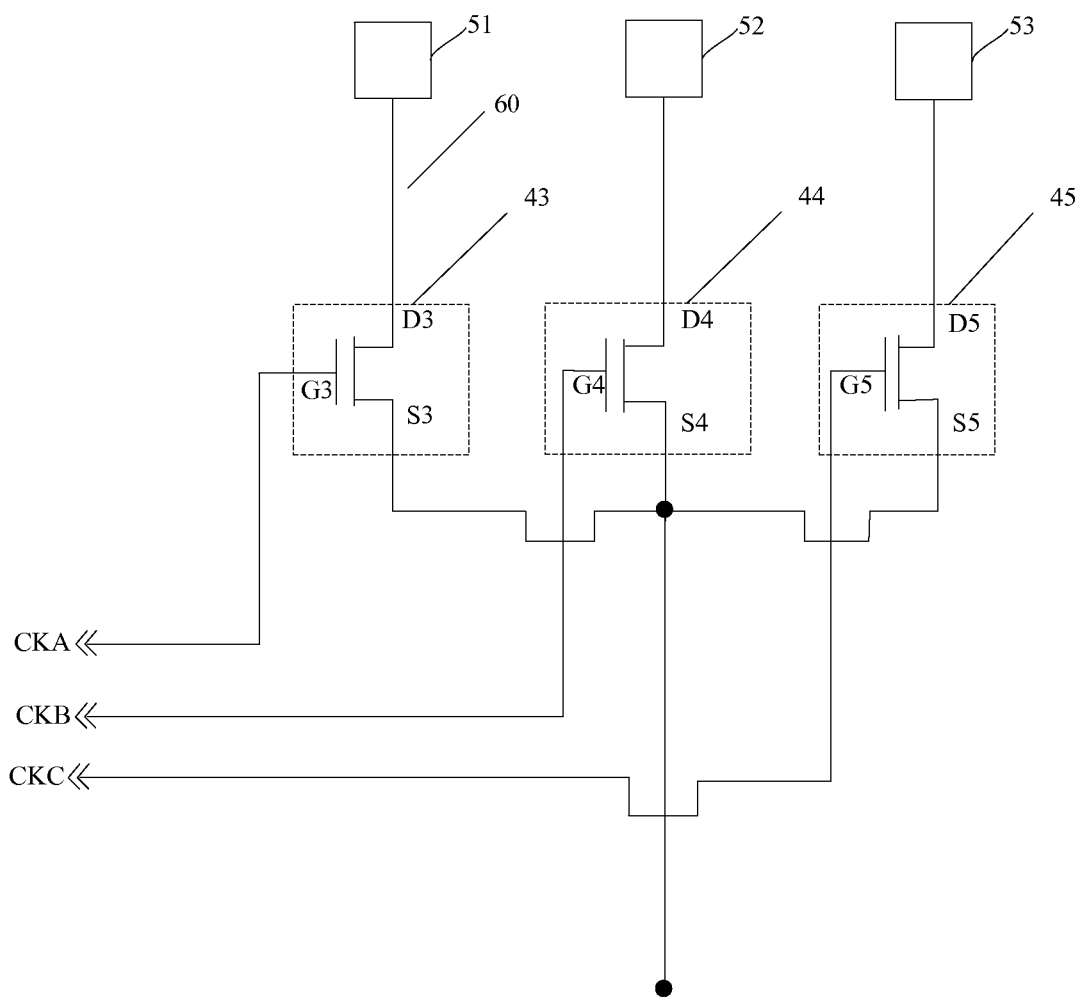
FIG. 7 shows a circuit diagram of a de-multiplexing circuit, according to embodiments of the disclosure.

FIG. 7 shows a circuit diagram of a de-multiplexing circuit, according to embodiments of the disclosure. As shown in FIG. 7, the de-multiplexing circuit includes a third switch 43, a fourth switch 44 and a fifth switch 45. A control terminal G3, an input terminal S3 and an output terminal D3 of the third switch 43 are connected with a first clock signal CKA, the output terminal of the first switch 41 and the output terminal of the second switch 42, and a data line 60 and a first sub-pixel electrode 51, respectively; a control terminal G4, an input terminal S4 and an output terminal D4 of the fourth switch 44 are connected with a second clock signal CKB, the output terminal of the first switch 41 and the output terminal of the second switch 42, and a data line 60 and a second sub-pixel electrode 52, respectively; and a control terminal G5, an input terminal S5 and an output terminal D5 of the fifth switch 45 are connected with a third clock signal CKC, the output terminal of the first switch 41 and the output terminal of the second switch 42, and a data line 60 and a third sub-pixel electrode 53, respectively. One or more of the first sub-pixel electrode 51, the second sub-pixel electrode 52 and the third sub-pixel electrode 53 are applied with display signals to display an image. In some embodiments, the first sub-pixel electrode 51, the second sub-pixel electrode 52 and the third sub-pixel electrode 53 are red, green and blue sub-pixel electrodes, respectively. However, the disclosure is not limited thereto.

In some embodiments, the third, fourth and fifth switches 43, 44 and 45 are embodied as TFTs.

In some embodiments, the de-multiplexing circuit includes the third switch 43, the fourth switch 44 and the fifth switch 45. The output terminal of the third switch 43 is connected with the first sub-pixel electrode 51, the output terminal of the fourth switch 44 is connected with the second sub-pixel electrode 52, and the output terminal of the fifth switch 45 is connected with the third sub-pixel electrode 53; the control terminal of the third switch 43 is connected with the first clock signal, the control terminal of the fourth switch 44 is connected with the second clock signal, and the control terminal of the fifth switch 45 is connected with the third clock signal; each of, the input terminal of the third switch 43, the input terminal of the fourth switch 44 and the input terminal of the fifth switch 45 is connected with the output terminal of the first switch 41 and the output terminal of the second switch 42. The input terminal of the first switch 41 is connected with the display signal input line for transmission of a display signal, and the input terminal of the second switch 42 is connected with the touch driving signal input line for transmission of a touch driving signal.

In some embodiments, the third switch 43, the fourth switch 44 and the fifth switch 45 are embodied as N-type TFTs, or as P-type TFTs.

Figure 8:
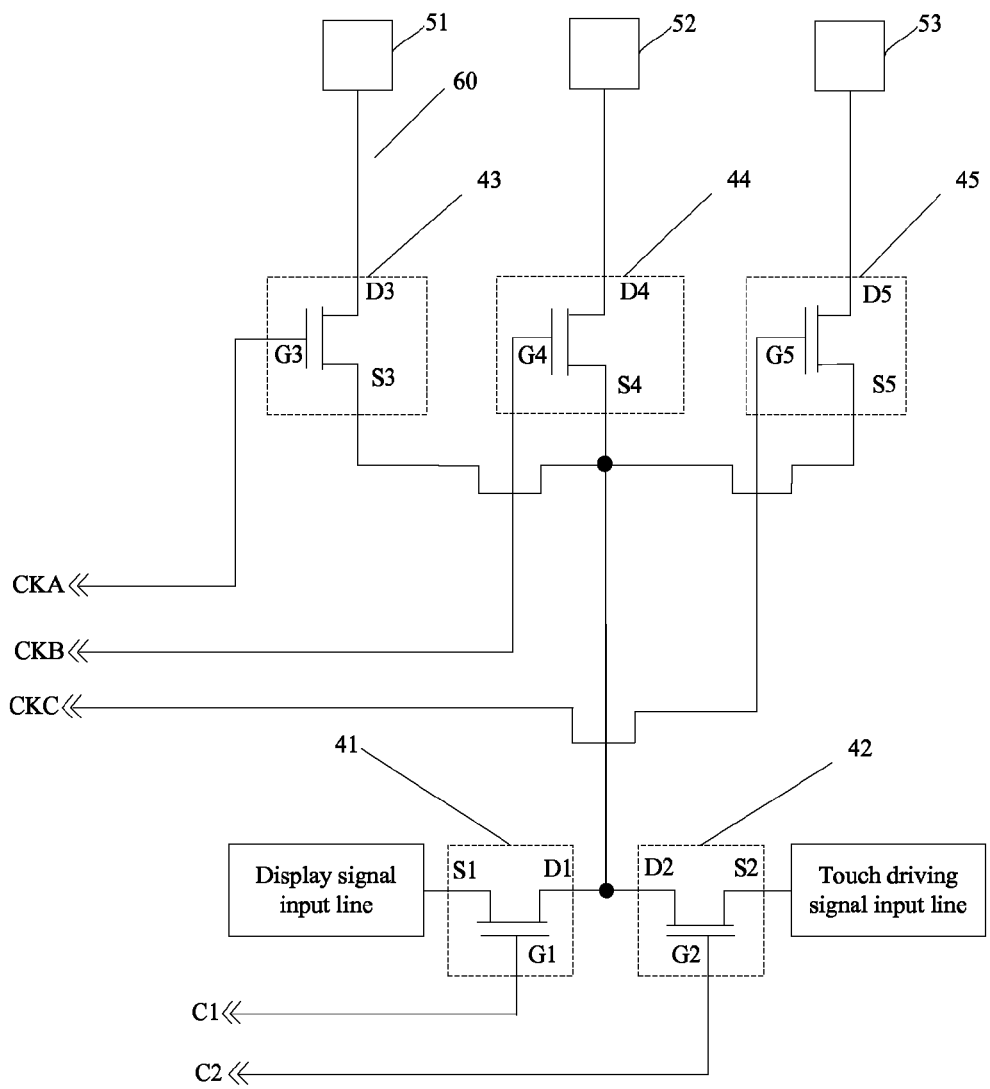
FIG. 8 shows a circuit diagram of a drive circuit of a touch panel, according to embodiments of the disclosure.

FIG. 8 shows a circuit diagram of the drive circuit of the touch panel, according to embodiments of the disclosure. As shown in FIG. 8, the first switch 41 is embodied as a fourth TFT and the second switch 42 is embodied as a fifth TFT, where a drain electrode of the fourth TFT is connected with both a drain electrode of the fifth TFT and an input terminal of the de-multiplexing circuit, a gate electrode of the fourth TFT is connected with the first control line C1, and a source electrode of the fourth TFT is connected with the display signal input line for transmission of display signals; while a source electrode of the fifth TFT is connected with the touch driving signal input line for transmission of touch driving signals, and a gate of the fifth TFT is connected with the second control line C2.

The type of signal output from the TFT may be selectively controlled by the level signal input to the gate electrode of the TFT. Herein, the TFT may be either an N-type TFT or a P-type TFT, as long as the TFT can be utilized to close or open the circuit.

In some embodiments, the third switch 43, the fourth switch 44 and the fifth switch 45 are embodied as N-type TFTs, or as P-type TFTs.

In light of the technical solutions of the disclosure, the above various circuits may be implemented by diversified circuit connections and circuit elements with various parameters to achieve functions thereof, which is not limited herein.

Figure 9A:
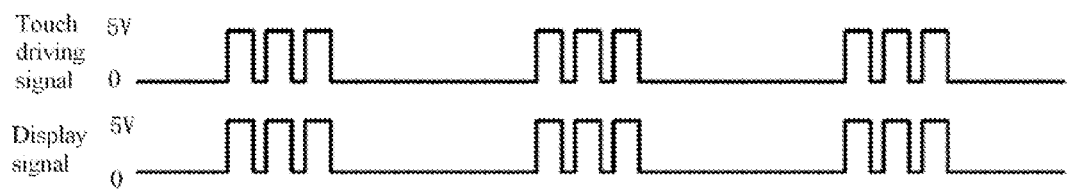
FIG. 9A shows waveforms of a touch driving signal and a display signal which are inputted to the de-multiplexing circuit during a touch phase, according to embodiments of the disclosure.
Figure 9B:
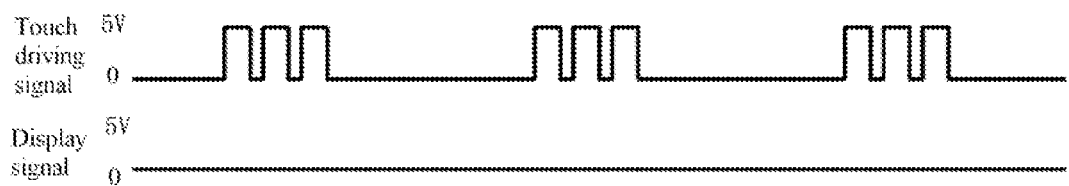
FIG. 9B shows waveforms of a touch driving signal and a display signal which are outputted from the de-multiplexing circuit during the touch phase, according to embodiments of the disclosure.

In some embodiments, in the drive circuit of the touch panel, the display signal input line is disconnected from the touch driving signal input line in the display phase, while in the touch phase, the display signal input line is connected with the touch driving signal input line. FIG. 9A shows waveforms of a touch driving signal and a display signal which are inputted to the de-multiplexing circuit during a touch phase, according to embodiments of the disclosure. As shown in FIG. 9A, the waveforms of the touch driving signal and the display signal which are inputted to the de-multiplexing circuit during the touch phase are identical. FIG. 9B shows waveforms of a touch driving signal and a display signal which are outputted from the de-multiplexing circuit during the touch phase, according to embodiments of the disclosure. As shown in FIG. 9B, the de-multiplexing circuit outputs the touch driving signal but not the display signal during the touch phase. According to a formula Q=CU, where Q represents a charge amount, C represents a capacitance value, and U represents a voltage potential difference, a decrease of U causes a decrease of Q given that the coupling capacitance is not changed, and the decrease of Q reduces the load of the drive IC. As such, voltage signals on the touch driving signal lines and the data lines are identical during touching, therefore loads are identical and phase shift would not occur, thereby reducing signal delays, lowering a phase difference, and reducing the coupling capacitance and the load of the drive IC in the touch driving phase, so that the time for charging the touch electrodes by the touch driving signal is reduced and power consumption is decreased; further, the signal selection circuit has a simple structure without significantly increasing the complexity of the structure of the touch panel.

Embodiments of the disclosure provide an example of the touch panel. The example of the touch panel is based on the above-described drive circuit of the touch panel, and for details not provided in describing the example of the touch panel, reference may be made to the previous description of the circuit of the touch panel.

The touch panel includes the drive circuit of the touch panel described in any of the previous embodiments, and reference may be made thereto for description and explanation of relevant principles and concepts.

The touch panel provided in the present embodiment includes a color filter substrate, an array substrate disposed opposite to the color filter substrate, and the drive circuit of the touch panel described in any of the previous embodiments.

The de-multiplexing circuit and the signal selection circuit are disposed at a non-display region of the array substrate of the touch panel.

At least two common electrode blocks are provided at a display region of the array substrate, and each of the at least two common electrode blocks is connected with a touch driving signal line and is operable as a touch electrode.

In the display phase, a common voltage is applied to the at least two common electrode blocks via the touch driving signal lines.

In the touch phase, touch driving signals are applied to the at least two common electrode blocks via the touch driving signal lines.

It should be noted that, the touch panel includes other components for normal operations of the touch panel in addition to the drive circuit of the touch panel, where the touch panel may be one described in any one of the previous embodiments. The touch panel may be used in a mobile phone, a desktop computer, a laptop computer, a tablet computer, an electronic photo frame, or electronic pater.

In some embodiments, the display signal input line may be connected with the touch driving signal input line via the signal selection circuit in the touch panel, and the touch driving signals are applied to the data lines in the touch phase, so that the pulse signals on the data lines are identical to (in terms of frequency and amplitude of the pulse signal) the pulse signals on the touch driving signal lines and touch electrodes in the touch phase, thereby decreasing the voltage difference between the data lines and the touch driving signal lines as well as the touch electrodes, reducing the load of the drive IC and the coupling capacitances in the touch phase, and shortening the time for charging the touch electrodes by the touch driving signals, so that the power consumption is reduced. Further, the signal selection circuit has a simple structure without significantly increasing the complexity of the structure of the touch panel.

Some embodiments and the applied technology principles of the disclosure have been described as above. It should be understood for those skilled in the art that the disclosure is not limited to embodiments described herein. Various apparent changes, readjustments and alternatives can be made by those skilled in the art without departing from the scope of the disclosure. Therefore, although the disclosure is illustrated in detail in combination with the above embodiments, the disclosure is not limited to these embodiments, and can further include other equivalent embodiments without departing from the scope of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

I claim:

1. A drive circuit of a touch panel, comprising a signal selection circuit and a de-multiplexing circuit,
wherein a first input terminal of the signal selection circuit is connected with a touch driving signal input line for transmission of a touch driving signal,
a second input terminal of the signal selection circuit is connected with a display signal input line for transmission of a display signal, and
an output terminal of the signal selection circuit is connected with an input terminal of the de-multiplexing circuit;
an output terminal of the de-multiplexing circuit is connected with a plurality of pixel electrodes through respective data lines:
in a display phase, the signal selection circuit is configured to forward the display signal received from the display signal input line to the de-multiplexing circuit, which is configured to de-multiplex the display signal from the signal selection circuit and transmit signals resulting from the de-multiplexing of the display signal to the data lines; and
in a touch phase, the signal selection circuit is configured to forward the touch driving signal received from the touch driving signal input line to the de-multiplexing circuit, which is configured to de-multiplex the touch driving signal from the signal selection circuit and transmit signals resulting from the de-multiplexing of the touch driving signal to the data lines
wherein the signal selection circuit comprises a first switch and a second switch,
wherein the first switch is configured to connect a first input terminal of the signal selection circuit to an output terminal of the signal selection circuit, and the second switch is configured to connect a second input terminal of the signal selection circuit to the output terminal of the signal selection circuit.

2. The drive circuit of the touch panel of claim 1, wherein a control terminal, an input terminal and an output terminal of the first switch are connected with a first control line, the display signal input line and an input terminal of the de-multiplexing circuit, respectively, while a control terminal, an input terminal and an output terminal of the second switch are connected with a second control line, the touch driving signal input line and the input terminal of the de-multiplexing circuit, respectively.

3. The drive circuit of the touch panel of claim 1, wherein the first switch and the second switch are Thin Film Transistors.

4. The drive circuit of the touch panel of claim 1, wherein the de-multiplexing circuit comprises a third switch, a fourth switch and a fifth switch, wherein an output terminal of the third switch is connected with a first sub-pixel electrode, an output terminal of the fourth switch is connected with a second sub-pixel electrode, and an output terminal of the fifth switch is connected with a third sub-pixel electrode; a control terminal of the third switch is connected with a first clock signal, a control terminal of the fourth switch is connected with a second clock signal, and a control terminal of the fifth switch is connected with a third clock signal; each of an input terminal of the third switch, an input terminal of the fourth switch and an input terminal of the fifth switch is connected with an output terminal of the first switch and an output terminal of the second switch; and an input terminal of the first switch is connected with the touch driving signal input line for transmission of the touch driving signal, and an input terminal of the second switch is connected with the display signal input line for transmission of the display signal.

5. The drive circuit of the touch panel of claim 4, wherein the third switch, the fourth switch and the fifth switch are embodied as N-type Thin Film Transistors, or as P-type Thin Film Transistors.

6. A touch panel, comprising
a color filter substrate,
an array substrate disposed opposite to the color filter substrate, and
a drive circuit of a touch panel; wherein the drive circuit of a touch panel, comprising
a signal selection circuit and a de-multiplexing circuit,
wherein a first input terminal of the signal selection circuit is connected with a touch driving signal input line for transmission of a touch driving signal,
a second input terminal of the signal selection circuit is connected with a display signal input line for transmission of a display signal, and
an output terminal of the signal selection circuit is connected with an input terminal of the de-multiplexing circuit;
an output terminal of the de-multiplexing circuit is connected with a plurality of pixel electrodes through respective data lines;
in a display phase, the signal selection circuit is configured to forward the display signal received from the display signal input line to the de-multiplexing circuit, which is configured to de-multiplex the display signal from the signal selection circuit and transmit signals resulting from the de-multiplexing of the display signal to the data lines; and
in a touch phase, the signal selection circuit is configured to forward the touch driving signal received from the touch driving signal input line to the de-multiplexing circuit, which is configured to de-multiplex the touch driving signal from the signal selection circuit and transmit signals resulting from the de-multiplexing of the touch driving signal to the data lines
wherein the signal selection circuit comprises a first switch and a second switch,
wherein the first switch is configured to connect a first input terminal of the signal selection circuit to an output terminal of the signal selection circuit, and the second switch is configured to connect a second input terminal of the signal selection circuit to the output terminal of the signal selection circuit.

7. The touch panel of claim 6, wherein the de-multiplexing circuit and the signal selection circuit are disposed at a non-display region of the array substrate of the touch panel.

8. The touch panel of claim 6, wherein at least two common electrode blocks are provided at a display region of the array substrate, and each of the at least two common electrode blocks is connected with a touch driving signal line,
in a display phase, a common voltage is applied to the at least two common electrode blocks via touch driving signal lines; and
in a touch phase, touch driving signals are applied to the at least two common electrode blocks via the touch driving signal lines.

* * * * *